US010873265B2

(12) United States Patent
Xue et al.

(10) Patent No.: US 10,873,265 B2
(45) Date of Patent: Dec. 22, 2020

(54) BIDIRECTIONAL THREE-PHASE DIRECT CURRENT (DC)/DC CONVERTERS

(71) Applicant: Virginia Tech Intellectual Properties, Inc, Blacksburg, VA (US)

(72) Inventors: Hao Xue, Blacksburg, VA (US); Bin Li, Blacksburg, VA (US); Qiang Li, Blacksburg, VA (US); Fred C. Lee, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 16/289,322

(22) Filed: Feb. 28, 2019

(65) Prior Publication Data
US 2019/0379291 A1  Dec. 12, 2019

Related U.S. Application Data

(63) Continuation-in-part of application No. 16/006,117, filed on Jun. 12, 2018.

(51) Int. Cl.
*H02M 3/335* (2006.01)
*H02M 7/219* (2006.01)

(52) U.S. Cl.
CPC ....... *H02M 3/33584* (2013.01); *H02M 7/219* (2013.01)

(58) Field of Classification Search
CPC .......................... H02M 3/33584; H02M 7/219
See application file for complete search history.

(56) References Cited

U.S. PATENT DOCUMENTS 9,240,723 B2    1/2016  Boysen et al.
2006/0214866 A1 9/2006  Araki et al.
(Continued)

FOREIGN PATENT DOCUMENTS

CN    102223091 A    10/2011
CN    102403907      4/2012
(Continued)

OTHER PUBLICATIONS

Zahid et al; Design of Bidirectional DC-DC Resonant Converter for Vehicle-to-Grid (V2G) Applications, Oct. 2015, IEEE, vol. 1, No. 3, pp. 232-243. (Year: 2015).*
(Continued)

*Primary Examiner* — Thienvu V Tran
*Assistant Examiner* — Bart Iliya
(74) *Attorney, Agent, or Firm* — Thomas Horstemeyer, LLP

(57) ABSTRACT

A bidirectional three-phase direct current (DC)/DC converter and method are disclosed. The converter comprises a primary side comprising a DC bus having a positive side and a negative side, a first set of rectifiers connected between the positive side and the negative side of the DC bus, a first set of M resonant tanks connected to a respective rectifier of the first set of rectifiers and a first set of M transformers. Each transformer is connected to a respective resonant tank. Each resonant tank comprises a resonant capacitor and a resonant inductor. The secondary side of the converter is fully symmetrical to the primary side of the converter to ensure that the conversion gain in the forward and reverse directions is the same.

18 Claims, 6 Drawing Sheets

(56) References Cited

U.S. PATENT DOCUMENTS

| | | |
|---|---|---|
| 2009/0046486 A1 | 2/2009 | Lu et al. |
| 2010/0052568 A1* | 3/2010 | Cohen ............... H05B 33/0815 |
| | | 315/294 |
| 2012/0262953 A1 | 10/2012 | Jungreis et al. |
| 2012/0262966 A1* | 10/2012 | Luerkens ............. H02M 7/066 |
| | | 363/127 |
| 2013/0201725 A1 | 8/2013 | Boysen et al. |
| 2013/0343091 A1 | 12/2013 | Njiende T et al. |
| 2014/0334198 A1 | 11/2014 | Yang et al. |
| 2015/0180350 A1* | 6/2015 | Huang ................ H02J 7/0068 |
| | | 307/66 |
| 2015/0349649 A1 | 12/2015 | Zane et al. |
| 2016/0254756 A1 | 9/2016 | Yang et al. |
| 2016/0380547 A1* | 12/2016 | Chen .................... H02M 3/337 |
| | | 363/17 |
| 2017/0099008 A1* | 4/2017 | Keister .................. H02M 1/08 |
| 2017/0155332 A1 | 6/2017 | Sigamani et al. |
| 2017/0200552 A1 | 7/2017 | Chung et al. |
| 2017/0330678 A1 | 11/2017 | Harrison et al. |
| 2018/0366267 A1* | 12/2018 | Raimann ................ H01F 27/28 |
| 2019/0043661 A1 | 2/2019 | Jin et al. |

FOREIGN PATENT DOCUMENTS

| | | |
|---|---|---|
| CN | 102790533 A | 11/2012 |
| CN | 103595367 B | 2/2014 |

OTHER PUBLICATIONS

Kim, Ho-Sung, et al, "The high-efficiency isolated ac-dc converter using the three-phase interleaved LLC resonant converter employing the Y-connected rectifier," IEEE Transactions on Power Electronics, 2014, pp. 4017-4028, vol. 29, No. 8, doi: 10.1109/TPEL.2013,2290999.

Li, Bin, et al., "A High-Efficiency High-Density Wide-Bandgap Device-Based Bidirectional On-Board Charger," IEEE Journal of Emerging and Selected Topics in Power Electronics, 2018, pp. 1627-1636, vol. 6, No. 3, doi: 10.1109/JESTPE.2018.2845846.

Orietti, Enrico et al. "Current sharing in three-phase LLC interleaved resonant converter." Proc. IEEE ECCE, 2009, pp. 1145-1152.

Super Efficiency Rectifier Module, Huawei Technologies Co., Ltd. (2014). www.huawei.com.

* cited by examiner

US 10,873,265 B2

BIDIRECTIONAL THREE-PHASE DIRECT CURRENT (DC)/DC CONVERTERS

CROSS-REFERENCE TO RELATED APPLICATIONS

This application is a continuation-in-part application of, and claims priority to and the benefit of the filing date of, U.S. application Ser. No. 16/006,117, filed on Jun. 12, 2018, entitled "INTERLEAVED CONVERTERS WITH INTEGRATED MAGNETICS," which is hereby incorporated by reference herein in its entirety.

TECHNICAL FIELD

The invention relates to three-phase direct current (DC)/DC converters and methods associated therewith.

BACKGROUND

Power conversion is related to the conversion of electric power or energy from one form to another. Power conversion can involve converting between alternating current (AC) and direct current (DC) forms of energy, AC to AC forms, DC to DC forms, changing the voltage, current, or frequency of energy, or changing some other aspect of energy from one form to another. In that context, a power converter is an electrical or electro-mechanical device for converting electrical energy. A transformer is one example of a power converter, although more complicated systems, including complex arrangements of diodes, synchronous rectifiers, switching transistors, transformers, and control loops, can be used.

A DC/DC converter is a power converter that converts an input DC voltage into an output DC voltage. The DC/DC converter is poised to be an important element in future battery charging technology. It can be used in many applications. For example, in Electric Vehicle (EV) applications, a DC/Dc converter can be used in both an onboard charging element and as part of a charging station. In telecommunication applications, a DC/DC converter can be used in an uninterruptible power supply (UPS). In the renewable energy industry, a DC/DC converter has the potential to be used in applications for photovoltaic (PV) systems.

A bidirectional DC/DC converter is a DC/DC converter that converts a DC voltage at an input of the converter into a DC voltage at an output of the converter, and vice versa, with equal gain in both directions. The single-phase approach to bidirectional CLLC resonant DC/DC converters is limited in power conversion capability due to current stress on components of the converter.

Three-phase DC/DC converters have the advantage of higher power density and lower current per phase than single-phase designs. A variety of approaches have been introduced to address the need for three-phase DC/DC converters. For example, FIG. 1 is a schematic diagram of a three-phase DC/DC converter 2 proposed by Huawei Technologies Co., Ltd. of Shenzhen China. The converter 2 has resonant capacitors, $C_r$, 3 that are delta-connected on the primary side and transformers 4 that are Y-connected on the secondary side in a Y-node. The resonant inductors, $L_r$, 5 and transformers 6 on the primary side are in series for each phase, and they are connected in a Y-node.

An advantage of the Huawei design shown in FIG. 1 is that the transformer 6 and the resonant inductor 5 are in series for each phase. This allows the integration of the two components into a combined magnetic structure. Both sides of the transformer are connected in Y-node, which helps mitigate high order harmonic inside the transformer. A significant disadvantage of the design is that there are not resonant components on the secondary side of the converter 2. Consequently, the gain characteristics of reverse operation are different from the gain characteristics of forward operation. Therefore, the converter 2 cannot achieve full bidirectionality.

FIG. 2 is a schematic diagram of a three-phase DC/DC converter 11 proposed by Emerson Electric Company of Ferguson, Mo., U.S. The converter 11 has primary and secondary side transformer windings 12 and 13, respectively, that are delta connected. On the primary side, the capacitor $C_r$ 14 and inductor $L_r$ 15 for each resonant tank for each phase are in series and the resonant tanks are connected in a delta structure. The advantage of this design is that the transformer comprising inductors 12 and 13 has an ideal symmetry for good current sharing. The drawback of this design is that the resonant inductor 15 and transformer 12 on the primary side are not in series connection. Consequently, it is difficult to combine the resonant inductor 15 and transformer 12 into one magnetic structure, which increases manufacturing complexity and cost. In addition, because there are no resonant components on the secondary side, the converter 11 cannot achieve full bidirectionality.

FIG. 3 is a schematic diagram of a three-phase DC/DC converter 21 proposed by Delta Energy Systems of Switzerland. The primary-side windings 22 of the transformer are Y-connected. The secondary side has three full bridge rectifiers 23 that are connected in parallel with one another. This design has the same drawback as the Emerson design, i.e., because the resonant inductor 24 and transformer 22 on the primary side are not connected in series, it is difficult to combine the resonant inductor 24 and transformer 22 into one magnetic structure, which increases manufacturing complexity and cost. In addition, the non-coupled secondary-side transformers 26 introduce the potential of uneven current sharing among the secondary phases. Also, because there are no resonant components on the secondary side, the converter 21 cannot achieve full bidirectionality.

A need exists for a three-phase DC/DC converter that is fully bidirectional.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
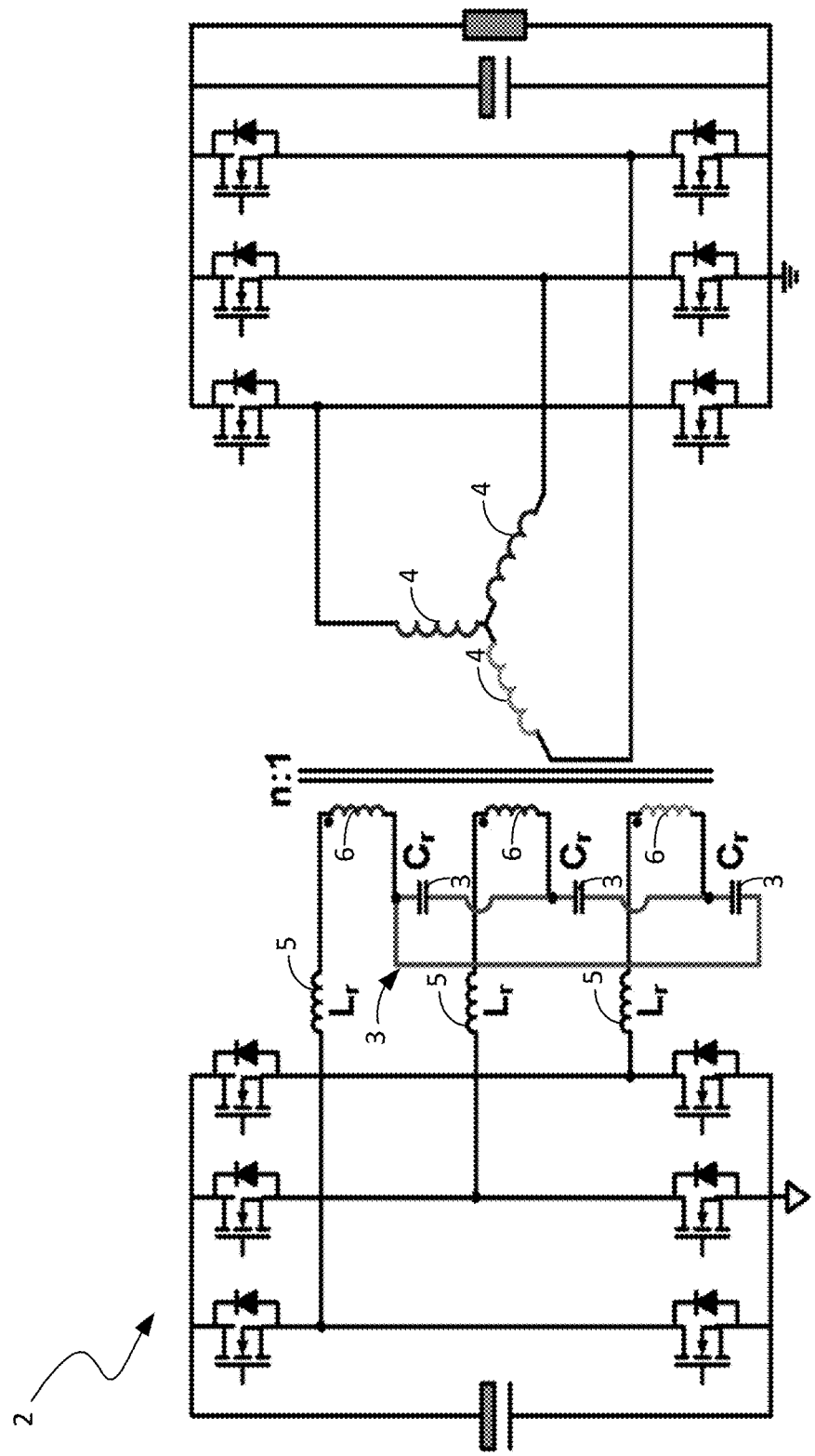
FIG. 1 is a schematic diagram of a known three-phase DC/DC converter.
Figure 2:
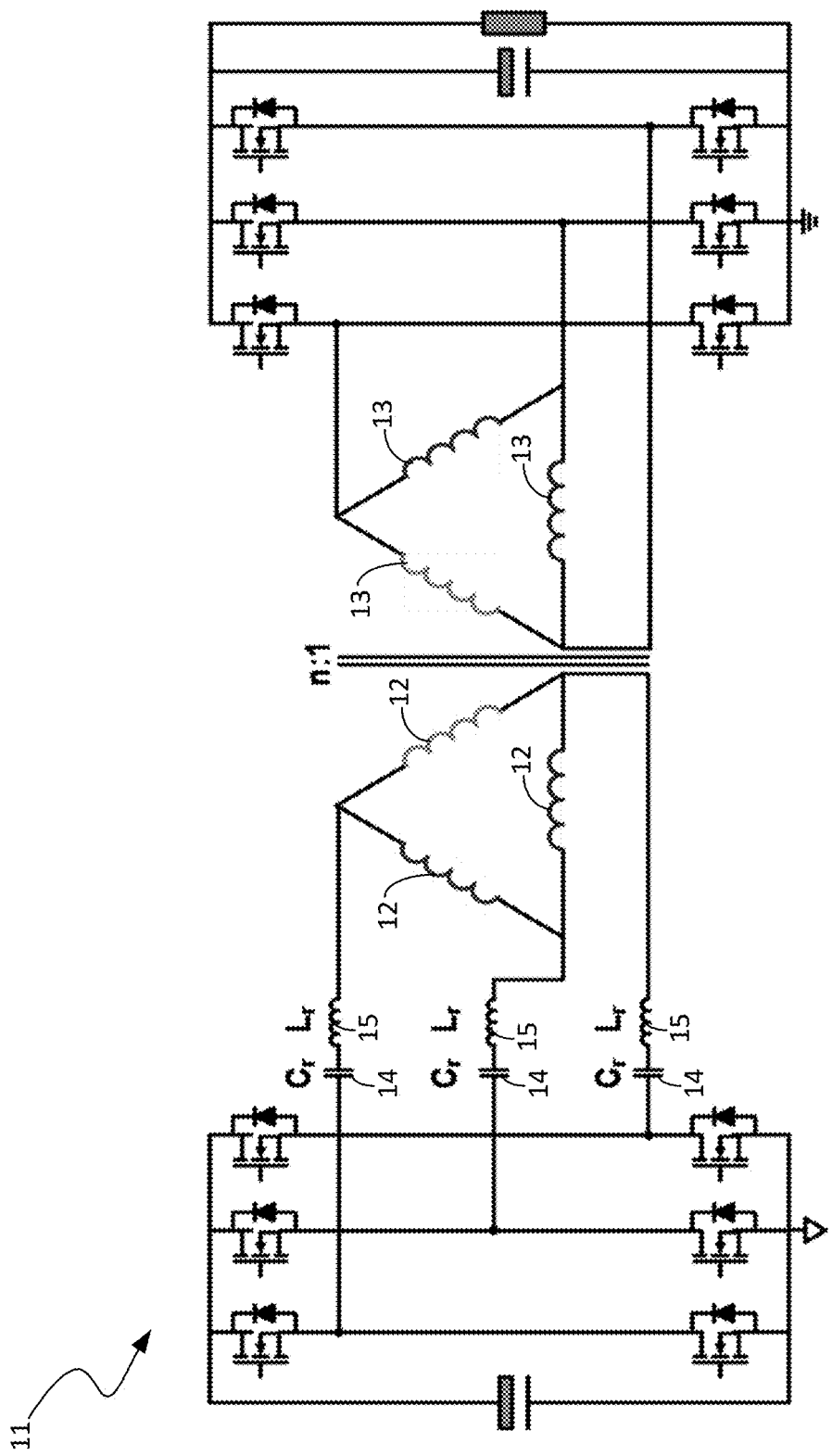
FIG. 2 is a schematic diagram of another known three-phase DC/DC converter.
Figure 3:
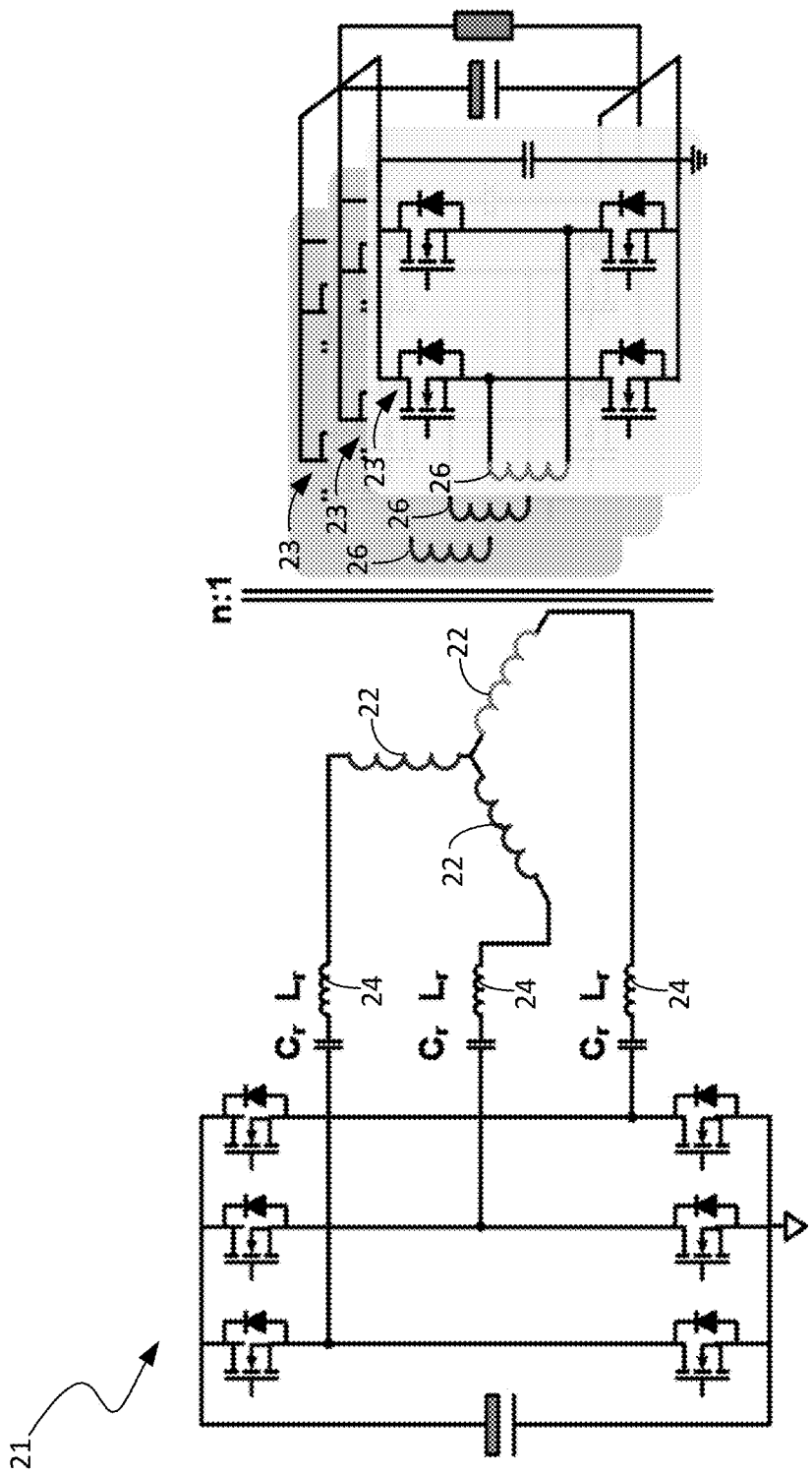
FIG. 3 is a schematic diagram of another known three-phase DC/DC converter.

The present disclosure is directed to a bidirectional three-phase DC/DC converter having primary and secondary sides that are fully symmetrical to ensure that the gain in the forward and reverse directions is the same, i.e., to ensure full bidirectionality. The converter comprises a primary side comprising a DC bus having a positive side and a negative side, a first set of rectifiers connected between the positive side and the negative side of the DC bus, a first set of M resonant tanks connected to a respective rectifier of the first set of rectifiers, and a first set of M transformers. Each transformer is connected to a respective resonant tank. Each resonant tank comprises a resonant capacitor and a resonant inductor. The secondary side of the converter is fully symmetrical to the primary side of the converter to ensure that the conversion gain in the forward and reverse directions is the same.

The terminology used herein is for purposes of describing particular embodiments only, and is not intended to be limiting. The defined terms are in addition to the technical and scientific meanings of the defined terms as commonly understood and accepted in the technical field of the present teachings.

As used in the specification and appended claims, the terms "a," "an," and "the" include both singular and plural referents, unless the context clearly dictates otherwise. Thus, for example, "a device" includes one device and plural devices.

Relative terms may be used to describe the various elements' relationships to one another, as illustrated in the accompanying drawings. These relative terms are intended to encompass different orientations of the device and/or elements in addition to the orientation depicted in the drawings.

It will be understood that when an element is referred to as being "connected to" or "coupled to" or "electrically coupled to" another element, it can be directly connected or coupled, or intervening elements may be present. When an element is referred to as being "directly connected to" another element, this refers to a connection without intervening elements other than electrical wires or other types of electrical conductors.

Exemplary, or representative, embodiments will now be described with reference to the figures, in which like reference numerals represent like components, elements or features. It should be noted that features, elements or components in the figures are not intended to be drawn to scale, emphasis being placed instead on demonstrating inventive principles and concepts.

Figure 4:
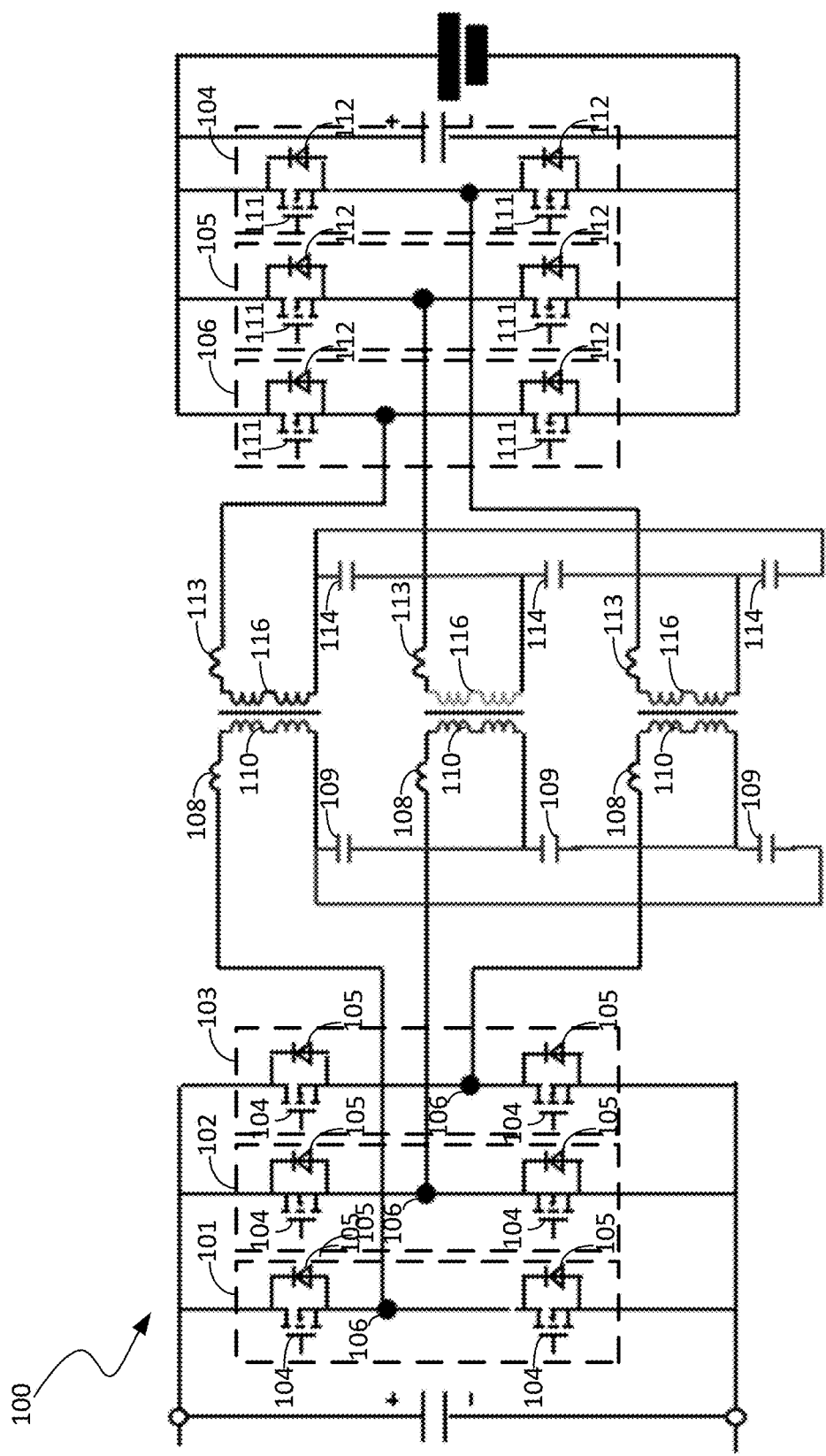
FIG. 4 is a schematic diagram of a bidirectional three-phase DC/DC converter in accordance with a representative embodiment.

FIG. 4 is a schematic diagram of a bidirectional three-phase DC/DC converter 100 in accordance with a representative embodiment. The bidirectional three-phase DC/DC converter 100 is a CLLC system comprising first, second and third half bridge rectifiers 101, 102 and 103, respectively, on the primary side and first, second and third half bridge rectifiers 104, 105 and 106, respectively, on the secondary side. Each half bridge rectifier 101-103 of the primary side is electrically coupled to a respective transformer 110 of the primary side via a respective resonant inductor 108 of a respective resonant tank of the primary side. Each resonant tank of the primary side comprises the respective resonant inductor 108 and a respective resonant capacitor 109. Each half bridge rectifier 104-106 of the secondary side is electrically coupled to a respective transformer 116 of the secondary side via a respective resonant inductor 113 of a respective resonant tank of the secondary side. Each resonant tank of the secondary side comprises the respective resonant inductor 113 and a respective resonant capacitor 114.

Thus, the bidirectional three-phase DC/DC converter 100 comprises three single-phase CLLC converters in parallel. The resonant capacitors 109 of the primary-side resonant tanks are delta-connected. Likewise, the resonant capacitors 114 of the secondary-side resonant tanks are delta-connected. The resonant inductors 108 of the primary side are in series with the respective transformers 110 of the primary side. The resonant inductors 113 of the secondary side are in series with the respective transformers 116 of the secondary side. Thus, this three-phase CLLC resonant converter design has a symmetrical structure from the primary side to the secondary side. This symmetrical structure ensures that the converter operation is substantially identical for both forward and reverse operation, thereby ensuring that the converter 100 achieves fully bidirectional power conversion.

It should be noted that because the resonant inductors 108 are in series with the respective transformers 110 on the primary side, and the resonant inductors 113 are in series with the respective transformers 116 on the secondary side, the resonant inductors 108, 113 and the transformers 110, 116 can be integrated into a single magnetic core. This greatly reduces the cost associated with making the inductors and therefore reduces the overall costs associated with manufacturing the converter 100.

Figure 5:
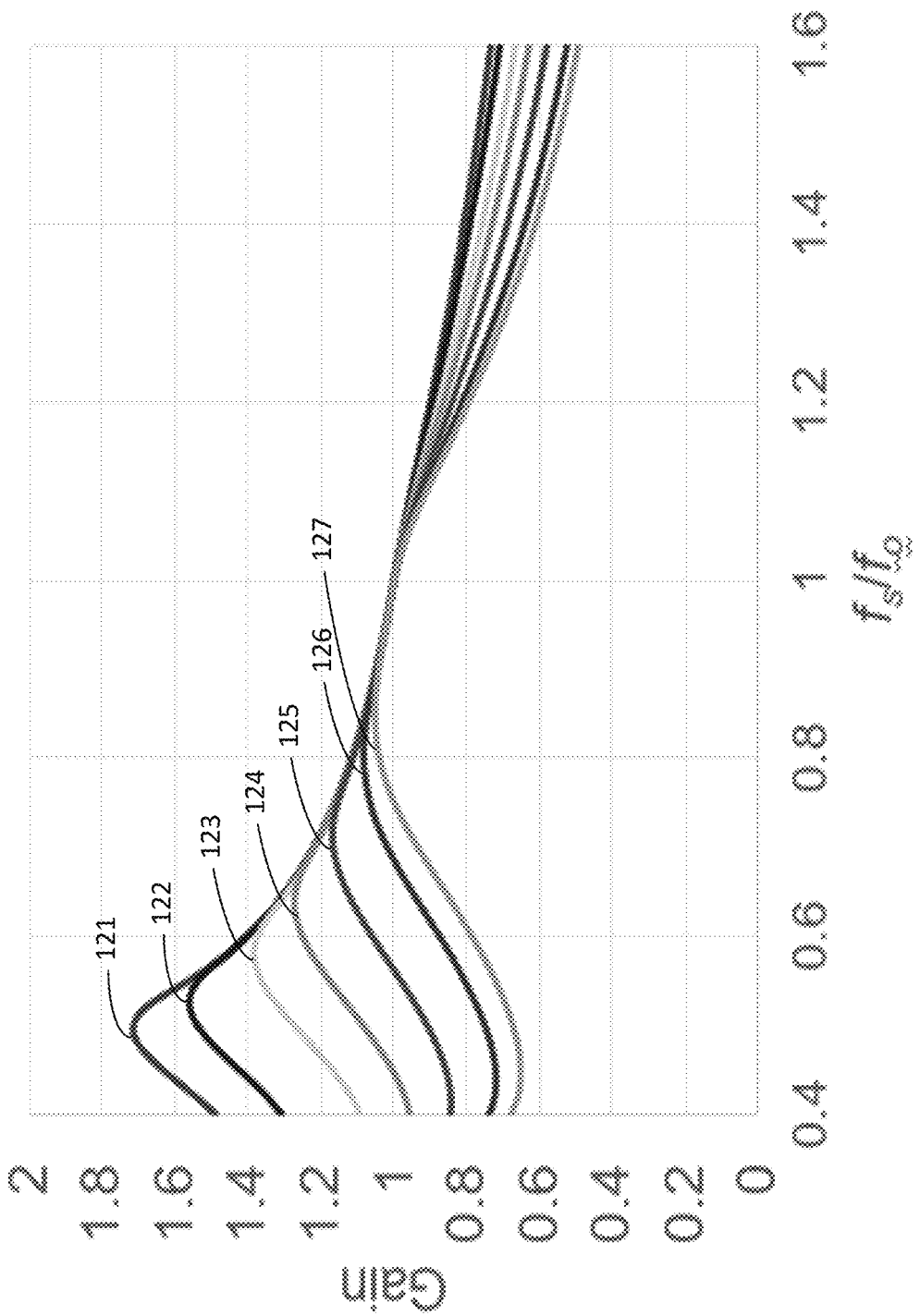
FIG. 5 is a graph showing the gain characteristics for forward and reverse operations of the bidirectional three-phase DC/DC converter 100 shown in FIG. 4.

FIG. 5 is a graph showing the gain characteristic curves 121-127 for forward and reverse operations of the bidirectional three-phase DC/DC converter 100 shown in FIG. 4. The horizontal axis of the graph represents fs/fo. The vertical axis of the graph represents gain in decibels (dB).

Figure 6:
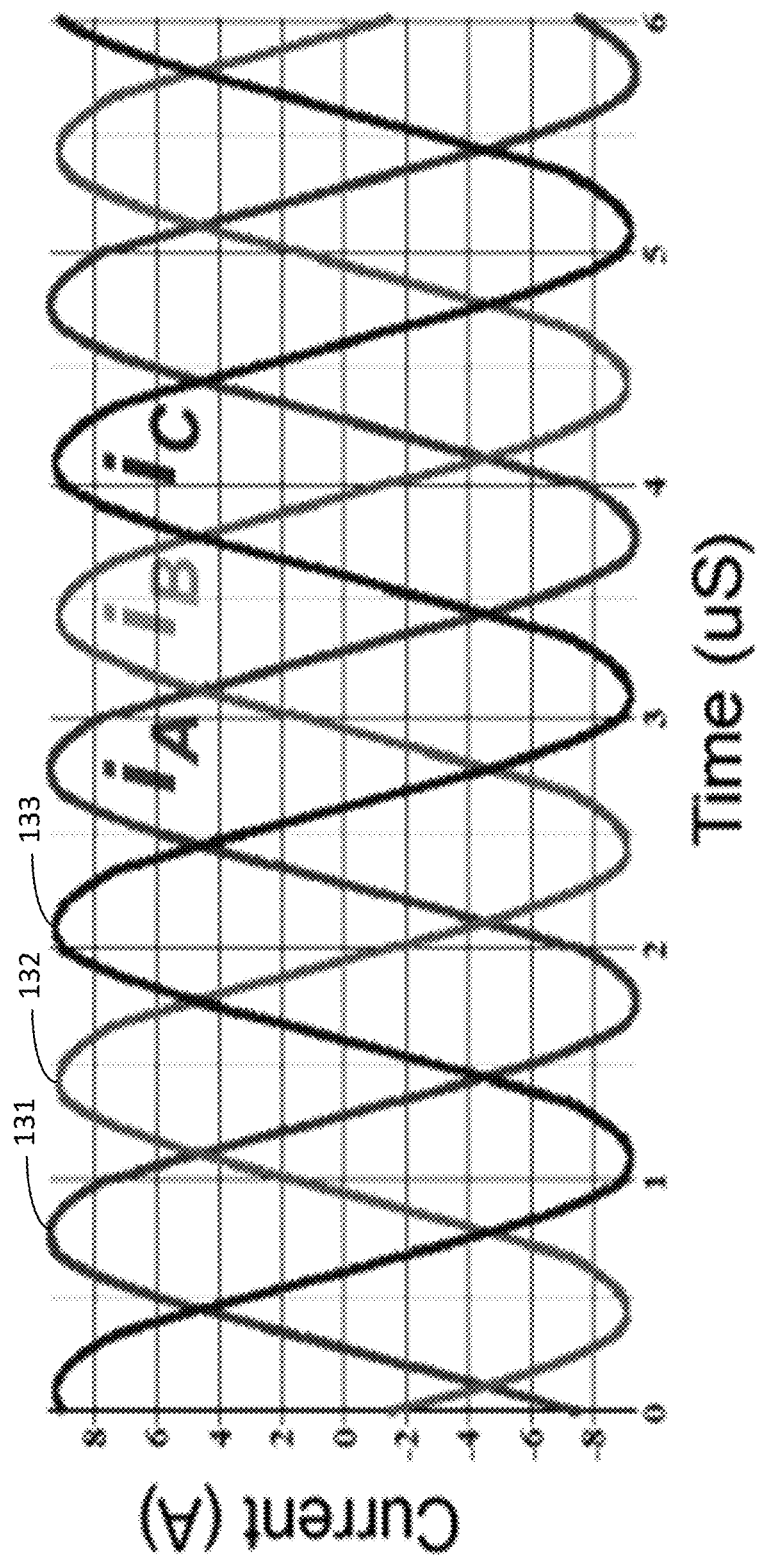
FIG. 6 is a graph of simulated phase A, phase B and phase C current waveforms of the bidirectional three-phase DC/DC converter shown in FIG. 4 as a function of time.

FIG. 6 is a graph of the simulated phase A, phase B and phase C current waveforms 131, 132 and 133, respectively, of the converter 100 as a function of time. The phase A, B and C currents are automatically balanced by the delta-connected resonant tank structure. Additionally, the fully symmetrical structure ensures that no higher-order harmonic currents will occur, which helps reduce core and winding loss that can reduce conversion efficiency.

It should be noted that while the primary and secondary sides of the converter 100 are fully symmetrical, this does not mean that the values of the elements or components used on the primary and secondary sides need to be identical or that the transformers are required to have the same turns ratio. Rather, the term "fully symmetric" means that the values are related to the turns ratios in such a way that the same gain is achieved in the forward and reverse directions. For example, the capacitors and inductors of the resonant tanks of the primary side do not have to have the same values as the capacitors and inductors of the resonant tanks of the secondary side. Also, the transformers of the primary and secondary sides can have different turns ratios.

It should be noted that the inventive principles and concepts have been described with reference to a few illustrative, or representative, embodiments for the purpose of demonstrating the inventive principles and concepts. Persons of skill in the art will understand how the principles and concepts of the invention can be applied to other embodiments not explicitly described herein. For example, while a particular configuration of the bidirectional three-phase converter is described herein and shown in FIG. 4, modifications may be made to the configuration without deviating from the scope of the inventive principles and concepts, as will be understood by those skilled in the art in view of the description provided herein. All such modifications are within the scope of the invention.

What is claimed is:

1. A bidirectional three-phase direct current (DC)/DC converter comprising:
   a primary side comprising:
      a first DC bus having a positive side and a negative side;
      a first set of M rectifiers connected between the positive side and the negative side of the first DC bus, where M is a positive integer that is greater than or equal to three;
      a first set of M resonant tanks, each resonant tank connected to a respective rectifier of the first set of rectifiers, each resonant tank comprising a resonant capacitor and a resonant inductor; and
      M transformers, each transformer having a primary side and a secondary side, each resonant tank of the first set of M resonant tanks being connected to the primary side of a respective transformer; and
   a secondary side comprising:
      a second DC bus having a positive side and a negative side;
      a second set of M rectifiers connected between the positive side and the negative side of the second DC bus; and
      a second set of M resonant tanks, each resonant tank of the second set of M resonant tanks being connected to a respective rectifier of the second set of rectifiers, each resonant tank of the second set of M resonant tanks comprising a resonant capacitor and a resonant inductor, each resonant tank of the second set of M resonant tanks being connected to the secondary side of a respective transformer, wherein a gain in a forward direction of DC/DC conversion is substantially equal to a gain in a reverse direction of DC/DC conversion.

2. The bidirectional three-phase DC/DC converter of claim 1, wherein each rectifier of the first set of rectifiers is a half bridge rectifier.

3. The bidirectional three-phase DC/DC converter of claim 2, wherein each rectifier of the second set of rectifiers is a half bridge rectifier.

4. The bidirectional three-phase DC/DC converter of claim 3, wherein the resonant capacitors of the first set of M resonant tanks are delta-connected.

5. The bidirectional three-phase DC/DC converter of claim 4, wherein the resonant capacitors of the second set of M resonant tanks are delta-connected.

6. The bidirectional three-phase DC/DC converter of claim 5, wherein the resonant inductors of the first set of M resonant tanks are in series with the respective primary sides of the transformers.

7. The bidirectional three-phase DC/DC converter of claim 6, wherein the primary sides of the transformers are Y-connected.

8. The bidirectional three-phase DC/DC converter of claim 7, wherein the resonant inductors of the second set of M resonant tanks are in series with the respective primary sides of the transformers.

9. The bidirectional three-phase DC/DC converter of claim 8, wherein the secondary sides of the transformers are Y-connected.

10. The bidirectional three-phase DC/DC converter of claim 9, wherein the resonant inductors of the first and second sets of M resonant inductors and the transformers are integrated into a single magnetic core.

11. The bidirectional three-phase DC/DC converter of claim 3, wherein each half bridge rectifier comprises first and second switches in parallel with first and second diodes, respectively, each resonant tank of the first set of M resonant tanks being connected to the respective rectifier of the first set of M half bridge rectifiers at a node in between the first and second switches.

12. The bidirectional three-phase DC/DC converter of claim 3, wherein the resonant capacitors of the first and second sets of M resonant tanks have capacitance values that are substantially equal.

13. The bidirectional three-phase DC/DC converter of claim 3, wherein the resonant capacitors of the first set of M resonant tanks have capacitance values that are unequal to the capacitance values of the resonant capacitors of the second set of M resonant tanks.

14. The bidirectional three-phase DC/DC converter of claim 3, wherein the resonant inductors of the first and second sets of M resonant tanks have inductance values that are substantially equal.

15. The bidirectional three-phase DC/DC converter of claim 3, wherein the resonant inductors of the first set of M resonant tanks have inductance values that are unequal to the inductance values of the resonant inductors of the second set of M resonant tanks.

16. The bidirectional three-phase DC/DC converter of claim 3, wherein the primary and secondary sides of the transformers have equal turns ratios.

17. The bidirectional three-phase DC/DC converter of claim 3, wherein the primary and secondary sides of the transformers have unequal turns ratios.

18. A bidirectional three-phase direct current (DC)/DC converter comprising:
   a primary side comprising:
      a first DC bus having a positive side and a negative side;
      a first set of half bridge rectifiers connected between the positive side and the negative side of the first DC bus, where M is a positive integer that is greater than or equal to three;
      a first set of M resonant tanks, each resonant tank of the first set of M resonant tanks being connected to a respective half bridge rectifier of the first set of M half bridge rectifiers, each resonant tank comprising a resonant capacitor and a resonant inductor, the resonant capacitors being delta-connected; and
      M transformers, each transformer having a primary side that is connected to a respective resonant tank of the first set of M resonant tanks, the primary sides of the transformers being Y-connected; and
   a secondary side comprising:
      a second DC bus having a positive side and a negative side;
      a second set of half bridge rectifiers connected between the positive side and the negative side of the second DC bus; and
      a second set of M resonant tanks, each resonant tank of the second set of M resonant tanks being connected to a respective half bridge rectifier of the second set of M half bridge rectifiers, each resonant tank of the second set of M resonant tanks comprising a resonant capacitor and a resonant inductor, the resonant capacitors of the second set of M resonant tanks being delta-connected, each transformer having a secondary side that is connected to a respective resonant tank of the second set of M resonant tanks, the secondary sides of the transformers being Y-connected, wherein a gain in a forward direction of DC/DC conversion is substantially equal to a gain in a reverse direction of DC/DC conversion.

* * * * *